United States Patent [19]
Kraft et al.

[11] 3,812,258
[45] May 21, 1974

[54] PHARMACEUTICAL COMPOSITION ESSENTIALLY CONTAINING AND METHOD OF TREATMENT WITH, 3 BETA-ACETOXY 11-OXO NOROLEANENE-(12) 20 BETA-CARBOXYLIC ACID N-METHYL PIPERIDOL-(4) ESTER

[75] Inventors: Helmut Kraft, Neckarhausen; Frank Zimmermann, Mannheim; Hans-Peter Hofmann, Ludwigshafen, all of Germany

[73] Assignee: Knoll AG, Chemische Fabriken, Ludwigshafen/Rhein, Germany

[22] Filed: Nov. 27, 1972

[21] Appl. No.: 309,750

Related U.S. Application Data

[62] Division of Ser. No. 174,924, Aug. 25, 1971, Pat. No. 3,758,484.

[30] Foreign Application Priority Data
Sept. 2, 1970  Germany.......................... 2043479

[52] U.S. Cl. .............................................. 424/267
[51] Int. Cl........................................... A61k 27/00
[58] Field of Search ................................... 424/267

[56]           References Cited
         UNITED STATES PATENTS
3,671,636   6/1972   Saari ............................... 424/330

Primary Examiner—Albert T. Meyers
Assistant Examiner—Frederick E. Waddell
Attorney, Agent, or Firm—Curtis, Morris & Safford

[57]           ABSTRACT

3-B-Acetoxy 11-oxo noroleanene-(12) 20B-carboxylic acid N-methyl piperidol-(4) ester and physiologically tolerable acid addition salts thereof that are orally administerable and have superior inflammation inhibiting and ulcer inhibiting properties.

3 Claims, No Drawings

PHARMACEUTICAL COMPOSITION ESSENTIALLY CONTAINING AND METHOD OF TREATMENT WITH, 3 BETA-ACETOXY 11-OXO NOROLEANENE-(12) 20 BETA-CARBOXYLIC ACID N-METHYL PIPERIDOL-(4) ESTER

This is a division of application Ser. No. 174,924 filed Aug. 25, 1971 now U.S. Pat. No. 3,758,484.

The present invention relates to a derivative of glycyrrhetinic acid, a process for the preparation thereof and a pharmaceutical composition containing such a derivative.

It is known from the work of R. S. H. Finney and G. F. Somers [J. Pharm. Pharmacol. 10, 613 (1958)] that glycyrahetinic acid [$3\beta$-hydroxy 11-oxo noroleanene-(12) $20\beta$-carboxylic acid] has inflammation inhibiting properties. The introduction of an acetyl group into the 3-position of glycyrrhetinic acid does not change the strength of the inflammation inhibiting effect.

It has now been discovered that a certain ester of $3\beta$-acetoxy glycyrrhetinic acid has very good inflammation-inhibiting properties.

The present invention therefore is concerned with $3\beta$-acetoxy 11-oxo noroleanene-(12) $20\beta$-carboxylic acid N-methyl-piperidol-(4)-ester of the formula

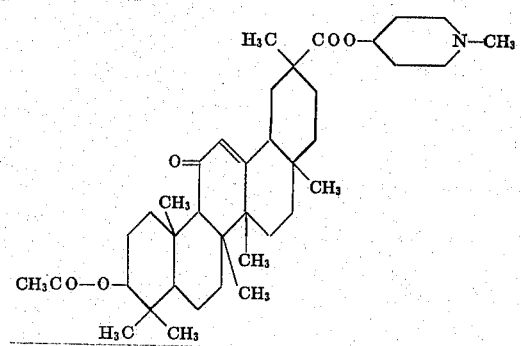

and the salts thereof formed with physiologically compatible acids.

The present invention is also concerned with a method for the preparation of the above compound and its salts wherein $3\beta$-acetoxy 11-oxo noroleanene-(12) $20\beta$-carboxylic acid (or a functional derivative thereof) is reacted with N-methyl pipenidol-(4). If desired, the resultant ester may then be converted into the salt of a physiologically compatible acid. The esterification can be performed according to methods known per se. Esterification occurs in high yields if the acid is converted into its chloride and then reacted with N-methyl-piperidol-(4).

The following are among acids considered to be physiologically compatible: hydrochloric acid, sulfuric acid, phosphoric acid, lactic acid, tartanic acid, fumaric acid, citric acid and sulfamic acid.

The Kaolin-Oedema test on rats$\alpha$ paws (J. Hillebrecht, Arzneimittelforschung 4, 607 (1954) ) indicates that the new compound of this invention and the salts thereof have inflammation-inhibiting properties approximately three times greater than Carbenoxolon (sodium salt). Carbenoxolon is $3\beta$-(3-carboxypropionyloxy)-11-oxo-$18\beta$-olean-12-en-30-acid.

In addition, the new compound and its salts lead to a reduction of the ulcer count [O. Munchow, Arzneimittelforschung 4, 341 (1954) ] and of the acid secretion in rats whose Pylorus was ligated. [H. Shay, S. A. Komaroy, S. S. Fels, D. Meranze, M. Gruenstein and H. Siplet, Gastroenterology 5, 43 (1945)]. With regard to the ulcer protective effect, the new compound and its salts are approximately ten times stronger than Carbenoxolon (sodium salt). In the LungOedema test [according to D. Henschler, W. Ross, Naunyn. Schmiedebergs Arch. exp. Path. Pharmakol. 241, 159 (1961)] the new substances show themselves to be approximately twice as strong as the Carbenoxolon (sodium salt).

Furthermore, the new substances are eight to 10 times more compatible than the sodium salt of Carbenoxolon, as shown by the determination of the acute toxicity in the Albino mouse (NMRI) after a single oral does according to D. J. Finney (Probit Analysis 1962).

The new compound and the salts thereof are therefore well suited for the treatment of disturbances of the alimentary canal, for example, such as gastric or duodenal ulcers. The new active substances are effective when taken orally in doses of approximately 1 - 10 mg/kg per day.

EXAMPLE 1

A mixture of $3\beta$-acetoxy-11-oxo-noroleanene-(12) $20\beta$-carboxylic acid chloride (8g, 0.015 mol), N-methyl-piperidol-(4) (3.62g, 0.032 mol) and toluene (180 ml) is boiled under reflux for 12 hours. After cooling, N-methyl-piperidol-(4)-hydrochloride which has separated out, is filtered off and diethyl ether (180ml) is added to the filtrate. By passing HCl gas therethrough, the hydrochloride of $3\beta$acetoxy-11-oxo-noroleanene-(12)-$20\beta$-carboxylic-acid-N-methyl-piperidol-(4)-ester is precipitated. A yield of 9.1g, representing 94 percent of the theoretical yield is obtained. The compound has an empirical formula of $C_{38}H_{59}NO_5HCl$ and a molecular weight of 646.33.

The product is recrystallized from isopropanol and yields colorless crystals having a melting point of 298°–300° C, and an [$\alpha$] $D^{20}$ of + 118.1 (Dimethylformamide, C = 0.5).

EXAMPLE 2

A mixture of $3\beta$-acetoxy 11-oxo noroleanene-(12) $20\beta$-carboxylic acid chloride (8g, 0.015 mol), N-methyl piperidol-(4) (3.62g, 0.032 mol) and toluene (180 ml) is boiled under reflux for 12 hours. After cooling, N-methyl piperidal-(4) hydrochloride, which has separated out, is filtered off and the filtrate is evaporated to dryness. The residue is recrystallized twice from a mixture of cyclohexane and n-hexane in a ratio of 1:5. $3\beta$-acetoxy 11-oxo noroleanene-(12) $20\beta$-carboxylic acid N-methyl piperidol (4) ester is obtained in a yield representing 95 percent of the theoretical yield. The compound has an empirical formula of $C_{38}H_{59}NO_5$, a molecular weight of 609.9, a melting point of 220°–221° C and an [$\alpha$] $D^{20}$ of + 127.1° (Dimethylformamide, C = 0.5).

By reacting with the corresponding free acids, the following salts may be obtained:
Sulfate
$C_{38}H_{59}NO_5 \cdot H_2SO_4$, molecular weight 707.94, having a melting point of 268° to 269° C when recrystallized from isopropanol [$\alpha$] $D^{20}$ = +107.6° (Dimethylformamide, c = 0.5)

Sulfamate
$C_{38}H_{59}NO_5 \cdot NH_2 \cdot HSO_3$, molecular weight 706.95 having a melting point of 275° to 276° C when recrystallized from dimethylformamide $[\alpha]\ D^{20} = +106.2°$ (Dimethylformamide $c = 0.5$)

Citrate
$C_{38}H_{59}NO_5 \cdot C_6H_8O_7$, molecular weight 801.98, having a melting point of 216° to 217° C when crystallized from isopropanol $[\alpha]\ D^{20} = +96.4°$ (Dimethylformamide $c = 0.5$)

EXAMPLE 3

Tablets of the following composition are formed by pressing on a tablet press:

50.00 mg  3-Acetoxy 11-oxo noroleanene-(12) 20β-carboxylic acid N-methyl piperidol-(4) ester hydrochloride
40.00 mg  Maize starch
4.50 mg  Gelatine
15.00 mg  Lactose
7.50 mg  Talc
0.75 mg  Aerosil (Registered Trade Mark) (chemically pure silicic acid in submicroscopically fine particles)
2.25 mg  Potato starch (as a 6% paste)

EXAMPLE 4

Sugar coated pills of the following compositions are prepared in the usual manner:

35.00 mg.  3β-Acetoxy 11-oxo noroleanene-(12) 20β-carboxylic acid N-methyl piperidol-(4) ester
85.00 mg  Core material
80.00 mg  Sweetening The core material consists of nine parts maize starch, three parts lactose and one part Luviscol VA 64 (Registered Trade Mark) (vinylpyrrolidone-vinyl acetate mixed polymerisate in a 60 : 40 ratio, Pharm. Ind. 1962 586). The sweetening consists of five parts cane sugar, two parts maize starch, two parts calcium carbonate and one part talc. The resultant sugar coated pills are then provided with a gastric juice-resistant coating.

We claim:

1. An inflammatory- and ulcer-inhibiting pharmaceutical composition comprising, as the active compound, an effective inflammatory-and ulcer-inhibiting amount of 3βacetoxy-11-oxo noroleanene-(12)-20β-carboxylic acid N-methyl piperidol-(4) ester or a salt thereof with a physiologically compatible acid and a therapeutically acceptable carrier.

2. A method of treating gastric or duodenal ulcers in a sufferer thereof which comprises the oral administration to said sufferer of an effective amount of the active compound identified in claim 1.

3. The method of claim 2 in which the effective amount is a dosage unit of about 1 to 10 mg/kg/day.

* * * * *